(No Model.)

E. J. HALL.
MECHANISM FOR TIMING WATCH BALANCES.

No. 288,233. Patented Nov. 13, 1883.

Witnesses
S. N. Piper
E. B. Pratt

Inventor
Edwin Jonas Hall.
by R. H. Eddy atty

UNITED STATES PATENT OFFICE.

EDWIN J. HALL, OF WALTHAM, MASSACHUSETTS.

MECHANISM FOR TIMING WATCH-BALANCES.

SPECIFICATION forming part of Letters Patent No. 288,283, dated November 13, 1883.

Application filed May 8, 1883. (No model.)

*To all whom it may concern:*

Be it known that I, EDWIN JONAS HALL, of Waltham, in the county of Middlesex, of the Commonwealth of Massachusetts, have invented a new and useful Improvement in Mechanism for Timing Watch-Balances; and I do hereby declare the same to be described in the following specification and represented in the accompanying drawings, of which—

Figure 1:
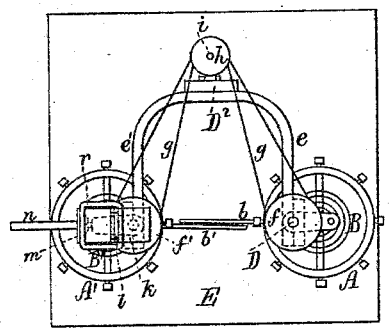
Figure 2:
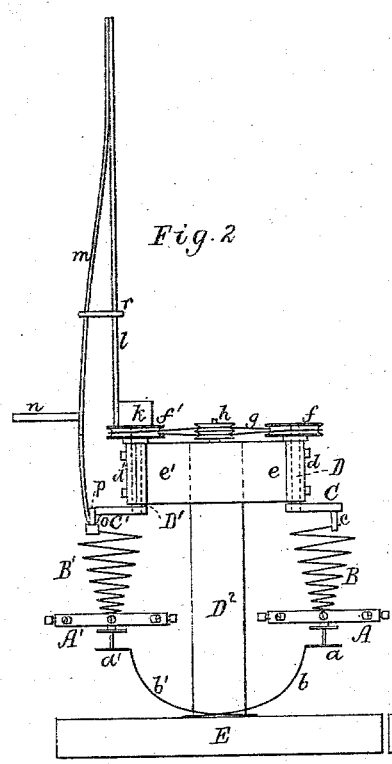
Figure 3:
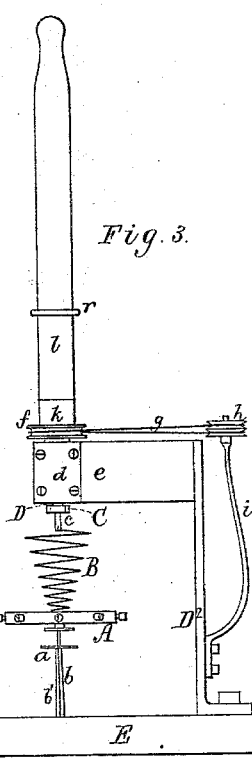
Figure 4:
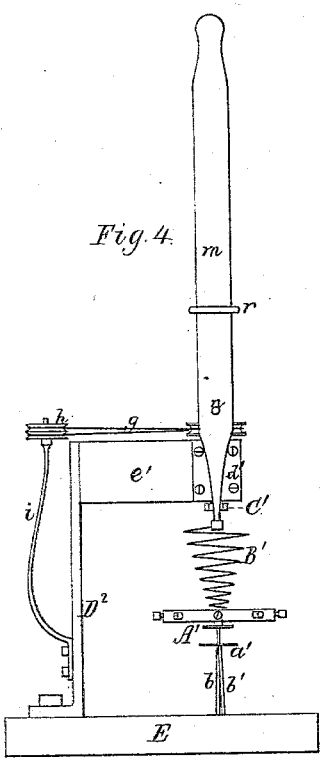

Figure 1 is a top view, Fig. 2 a front elevation, and Figs. 3 and 4 opposite side views, of a mechanism containing my invention, the nature of which may be stated to mainly consist, first, in the combination of two arms and their spindles and the supports of the latter with mechanism for turning one of the said spindles to the same extent as the other and at the same time, and with a force equal to that expended in turning the latter, such mechanism, as represented in the drawings, and as hereinafter explained, being two pulleys or wheels and an endless band extending around them, the said arms being provided with means of connecting them with the hair-springs of balances; second, in the combination of elastic or other proper bearings or steps for sustaining the pivots of the balances with the two arms, their spindles, and the supports of the latter, and the mechanism for turning one of the said spindles to the same extent as the other and at the same time, and with a force equal to that expended in turning the latter.

With the mechanism a standard balance is used—that is, one whose spring, when the balance is set in vibration, will cause it to have a given number of vibrations in a given period of time—the object of the machine being to ascertain the number of vibrations another watch-balance will make in the same time under the impetus of a force equal to that employed to put in vibration the standard balance. Having discovered the rate of vibration of the balance to be adjusted relatively to that of the standard balance, the attendant is to either take up or let out the spring of the first-named balance, or otherwise properly treat it to cause it to vibrate the balance in unison with the standard balance.

In the drawings the standard balance is shown at A and its hair-spring at B, the pivot of the balance being represented as resting on a plate, $a$, upheld by a curved spring, $b$. The spring B, at its upper end, passes through a stud, $c$, projecting down from an arm, C, extending, as shown, from a vertical spindle, D, at its lower end. The said spindle is supported in a suitable box or bearing, $d$, in one of two curved arms, $e\ e'$, extended from a post, $D^2$, erected on a base, E, to which the spring $b$, at its lower end, is fastened. There is fixed to the spindle D, at its upper end, a grooved wheel or pulley, $f$, about which and another such pulley, $f'$, fixed on another and like spindle, D′, an endless band, $g$, runs. This band, at its middle, goes around an intermediate pulley, $h$, pivoted on the upper part of a spring, $i$, such spring $i$ and pulley $h$ being to keep the band tight on the pulleys $f$ and $f'$. The spindle D′ is supported in a box, $d'$, of the arm $e'$. One of the said arms $e$ and $e'$ may be hinged or pivoted to the standard, so as to enable it to be moved either toward or away from the other arm, in order to carry the balance to be rated very near to the standard balance, as it frequently or generally happens that the balance to be rated or timed has a diameter larger or smaller than that of the standard balance. In ascertaining whether the two vibrate synchronously or not, it is desirable to have them very near to each other.

There projects from the spindle D′ an arm, C′, like the arm C, and from the pulley $f'$, or a head, $k$, arranged above such pulley and fixed to the spindle D′, a standard, $l$, projects, and has extending down from it a spring, $m$, from which an arm, $n$, extends, as shown. This spring and a projection, $o$, from the arm C′ answer as nippers to hold the stud $p$ of the hair-spring B′ of the balance A′ to be tested, the pivot of such balance A′ resting on a step, $a'$, supported by a spring, $b'$, extending upward from the base E.

A ring, $r$, adapted to encompass and slide on the standard $l$ and spring $m$, serves, when pushed down, to force the latter toward the arm C′.

The balance A′ to be timed or tested having been pivoted on the step $a'$, and the stud $p$ having been secured by the spring $m$ to the arm C′, if one takes hold of the arm $n$ and suddenly moves it laterally, so as to turn the spindle D' in its box, the spindle D will be simultaneously turned a like distance and with a like force, whereby the two balances will be put in vibration by equal forces. If the number of vibrations of each is the same in a given time, the balance being tested is correctly timed to the standard balance; but if otherwise the attendant is to do to the spring B' what may be necessary to cause it to properly act, all of which will be understood by watchmakers.

The steps $a\ a'$ are not actually essential, but they are very useful auxiliaries to my invention, as without them the balances may be vibrated; but the steps sustain them so as to prevent the balances from swinging more or less laterally while in vibration.

Various mechanical devices may be substituted for the pulleys and endless band hereinbefore described—as, for instance, gears or cranks and a rod pivoted to their wrists may be employed. So inelastic pivotal bearings may be sometimes used instead of those sustained by springs, as represented.

I claim—

1. The combination of the two arms C and C', their spindles D and D', and the supports of the said spindles with mechanism for turning at the same time one of the said spindles to the same extent and with a force equal to that employed to turn the other, such mechanism, as represented in the drawings, being the pulleys and endless band, applied as described, the said arms having means of attaching them to or connecting them with the hairsprings of two watch-balances arranged with them, as set forth.

2. The combination of a standard watch-balance, A, and its spring B, as described, the arms C C', spindles D D', pulleys $f\ f'$, and the endless band $g$, arranged, supported, and adapted substantially and to operate as set forth.

3. The combination of the steps or watch-balance pivot-bearings, as described, with the arms, spindles, pulleys, and endless band, arranged and adapted substantially and to operate as and for the purpose represented.

4. The combination of the steps or watch-balance pivot-bearings, a standard watch-balance and its spring, the two arms, two spindles, and their pulleys and endless band, all being arranged and adapted substantially in manner and to operate as and for the purpose set forth.

EDWIN JONAS HALL.

Witnesses:
C. F. STONE,
H. F. WARREN.